Dec. 23, 1941.  O. E. FISHBURN  2,267,452
BLOCKER SYNCHRONIZER
Filed Jan. 26, 1939
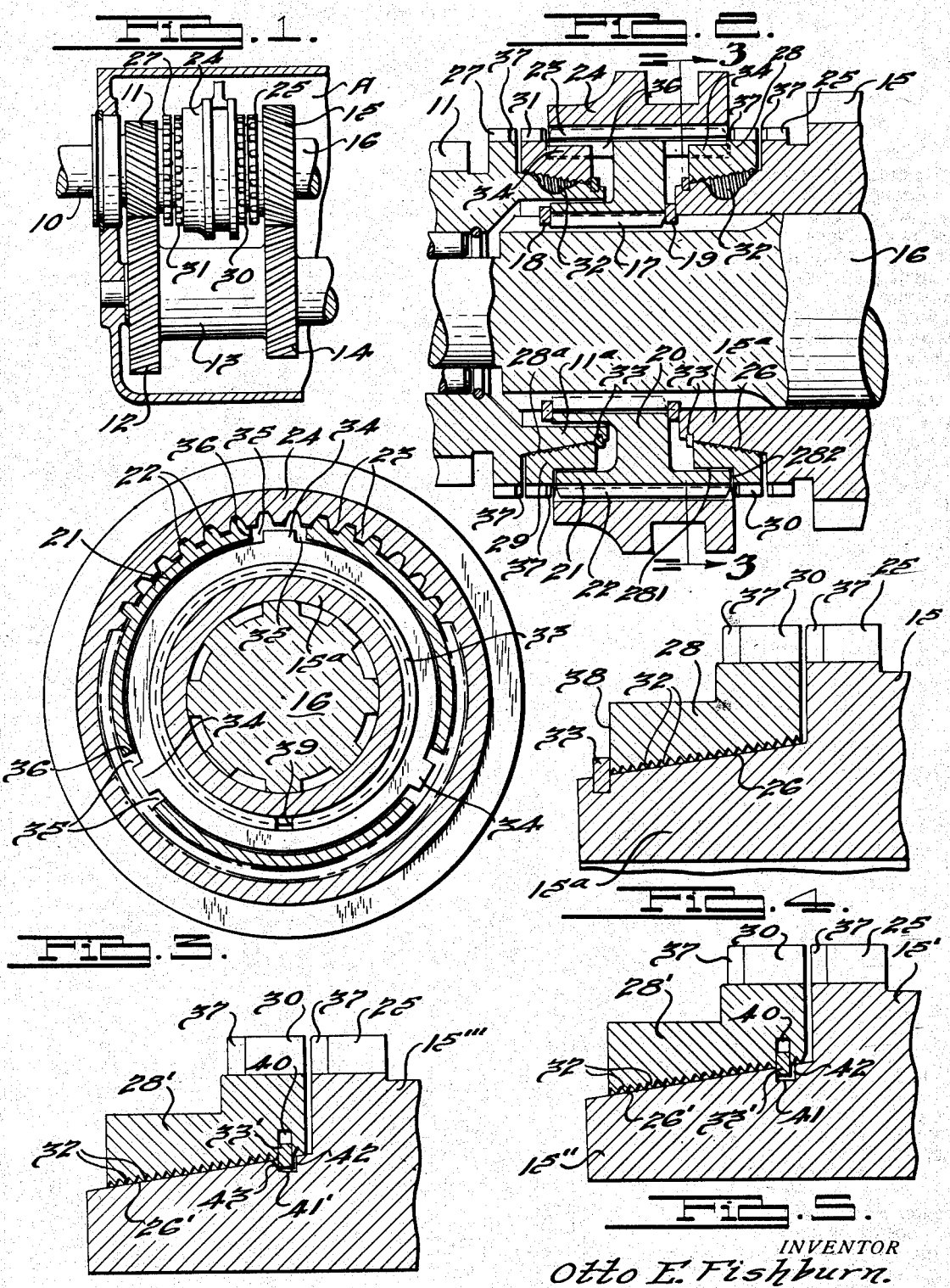
INVENTOR
Otto E. Fishburn.
BY
ATTORNEYS Patented Dec. 23, 1941

2,267,452

UNITED STATES PATENT OFFICE 2,267,452

BLOCKER SYNCHRONIZER

Otto E. Fishburn, Detroit, Mich., assignor to Chrysler Corporation, Highland Park, Mich., a corporation of Delaware Application January 26, 1939, Serial No. 252,871

11 Claims. (Cl. 192—53)

This invention relates to blocker synchronizers for clutching mechanisms.

One object of my invention is to provide a simplified mounting for the blocker synchronizer on the companion synchronizing part.

Another object of my invention is to provide an operating assembly of the blocker synchronizer and companion frictionally engaged part so arranged that the blocker has unrestricted blocking rotation.

A further object is to provide means for locking the frictionally engaging parts of a blocker synchronizer together, the locking means being releasable when desired to disassemble the blocker from the companion friction part.

It has heretofore been proposed to mount the blocker for movement with a sliding hub, the blocker and hub being assembled as a unit. Such arrangement restricts free blocking rotation of the blocker owing to the frictional engaging pressure between the hub and blocker at the time of engagement of the friction synchronizing surfaces and such prior devices often fail to perform the desired synchronizing and blocking functions. With my invention, the blocker is free from such frictional engagement with the hub at the time of engagement of the friction surfaces and the hub is preferably fixed against axial movement, the hub rotatably limiting the blocker without frictionally restricting free rotation of the blocker.

This invention relates in general to the subject matter of my copending application Serial No. 180,840, filed December 20, 1937, which is a continuation in part of Serial No. 108,123, filed October 29, 1936.

Further objects and advantages of my invention will be apparent from the following detail description of several embodiments thereof, reference being had to the accompanying drawing in which:

Fig. 1 is a sectional elevational view of a portion of a standard transmission with my invention applied thereto.

Fig. 2 is an enlarged sectional elevational view of a portion of the Fig. 1 transmission showing my blocker synchronizer.

Fig. 3 is a transverse sectional view taken as indicated by line 3—3 on Fig. 2.

Fig. 4 is an enlarged fragmentary sectional view of a portion of the Fig. 2 structure.

Fig. 5 is a view corresponding to Fig. 4 but illustrating a modified arrangement.

Fig. 6 is a view corresponding to Figs. 4 and 5 but illustrating a further modification.

In the drawing I have illustrated my invention in connection with the second and direct speed drives of a conventional transmission A although my blocker synchronizer may be used wherever blocker clutching is desired.

The transmission comprises the usual driving shaft 10 carrying the main drive pinion 11 meshing with countershaft gear 12. The countershaft 13 carries a gear 14 meshing with the second speed gear 15 which is loose on the transmission output shaft 16.

Splined at 17 to shaft 16 and preferably fixed by rings 18, 19 against movement axially of this shaft is a hub 20 having an outer annular rim 21 extending axially beyond the body portion of the hub and formed with a series of axially extending external teeth 22 engaged by the internal teeth 23 of a shift clutch member or sleeve 24.

Gear 15 has a forwardly extending portion 15ª formed with a series of external clutching teeth 25 and a friction clutching cone surface 26. Gear 11 likewise has a rear extension 11ª formed with clutching teeth 27 and cone surface 28ª, the sleeve teeth 23 being selectively engageable either with teeth 25 or 27 when the sleeve 24 is shifted rearwardly or forwardly to respectively drive shaft 16 from shaft 10 in the second or direct speed ratios.

As a means of frictionally synchronizing shaft 16 and hub 20 with gear 15 or gear 11 and preventing the positive clutching of the sleeve 24 with teeth 25 or 27 prior to synchronization, I provide blocker synchronizers in the form of rings 28, 29 respectively formed with blocker teeth 30, 31 of the same diametrical pitch as the teeth 23, 25 and 27 and respectively disposed between teeth 23 and teeth 25 and 27 as shown in Fig. 2 so that the blocker teeth will prevent shift of the sleeve until the parts to be positively clutched are synchronized.

Each blocker 28, 29 is formed with a cup 32 preferably threaded to provide a friction surface which will cut through the oil film at the cones 26, 28ª without grooving the cones as described and claimed in my aforesaid copending application. The threads are preferably of a left hand to assist in the release of the blockers after they perform their functions. The blockers 28, 29 are respectively mounted on the cone portions of gears 15 and 11 as a fixed sub-assembly by a snap ring 33 which seats in the respective gear extensions 15ª and 11ª. Each blocker has a plurality (three being shown) of circumferentially spaced radially projecting stops 34 each projecting with clearance 35 into an opening 36 formed by milling a radial slot through the portion of rim 21 which axially overhangs the body of the hub 20. The various teeth 30, 31, 25, 27 have their ends bevelled at 37 for contact with bevelled ends of sleeve teeth 23.

Fig. 4 is typical of the arrangement associated each gear and illustrates blocker 28 mounted on the extension 15a of gear 15, the snap ring 33 holding blocker 28 in assembled position by engaging the inner face 38. In the illustrated position of the blocker 28, prior to shift of sleeve 24 rearwardly, the blocker friction surface at threads 32 has slight clearance with cone 26 approximately the same as a normal good running bearing fit. Such a fit usually is in the neighborhood of .002 of an inch such as would be provided at gear 15 on shaft 16. Under such conditions the blocker 28 will be rotatably dragged with gear 15, the stops 34 engaging one side or the other of their associated slots 36 to maintain teeth 30 out of alignment with the sleeve teeth 23 so as to insure the blocking action whenever the hub 20 and gear 15 are rotating at different speeds. The blocker 28 has its sole support on the member which rotates it into blocking position, the blocker having clearance with the hub at 281 and 282.

Blocker 28 has only slight movement axially rearwardly, such movement (usually in the neighborhood of .007 to .008 of an inch) occurring when surface 32 is frictionally forced against surface 26 during the synchronizing action which occurs when sleeve 24 is shifted rearwardly for second speed. When the sleeve is thus shifted, teeth 23 engage the cammed ends 37 of blocker teeth 30 to exert synchronizing pressure at friction surfaces 32, 26. The synchronization is, practically speaking, almost instantaneous whereupon the sleeve teeth 23 can then force blocker teeth 30 into axial alignment therewith to permit the sleeve teeth to engage teeth 25 without clashing or damaging the teeth. As soon as the synchronizing takes place, the blocker 28 is axially unloaded and moves forward slightly to engage ring 33.

It will be apparent that the hub 20 is free from axial frictional thrust against the blocker 28, the engagement of lugs 34 in slots 36 serving to limit rotation of the blocker without axially thrusting frictionally thereon. Thus the blocker rotation is assured without restriction and the blocker always performs its blocking action. If desired the surfaces 32 may be smooth to match the surfaces 26 although I have found that the threads increase the efficiency of the servo action of synchronization.

The mounting of blocker 29 on extension 11a and the functions of this blocker for controlling forward shift of sleeve 24 are similar to the aforesaid description in connection with blocker 28 and need not be repeated.

In assemblying the synchronizers, blocker 28 for example is slipped over the end of extension 15a and spring ring 33 forced over the end of the extension until it snaps into locking position, the ring being split at 39 (Fig. 3) to accommodate its expansion when assembled.

In Fig. 5 the blocker 28' is associated with gear 15' just as in Fig. 4 except that the locking expansion ring 33' engages annular grooves 40, 41 respectively in the blocker 28' and extension 15'a. The groove 40 has sufficient radial clearance so that when the blocker and ring are together assembled on the cone 26', the ring may expand until it snaps into groove 41. The groove 41 has axial clearance at 42 sufficient to accommodate the slight axial movement of the blocker rearwardly when surfaces 32 and 26' are frictionally engaged under synchronizing pressure.

In Fig. 6 the arrangement is similar to Fig. 5 except that the forward face 43 of the corresponding groove 41' is inclined sufficiently to wedge the ring 33' outwardly if the blocker 28' is pulled forwardly thereby permitting disassembly of the blocker from the gear 15'''. The inclination at 43 is not, however, slight enough to permit the blocker to work forwardly during operation of the assembled device.

I do not limit my invention, in the broader aspects thereof, to any particular combination and arrangement of parts such as shown and described for illustrative purposes since various modifications will be apparent from the teachings of my invention and scope thereof as defined in the appended claims.

I claim:

1. In a clutching device of the character described, a first rotatable structure having external clutching teeth and a friction surface, an axially stationary second rotatable structure having external teeth, a blocker member having a friction surface engageable with the aforesaid friction surface under relatively light blocker-energizing pressure and blocker teeth axially between the teeth of said first and second structures, means for driving said blocker member from said second structure with clearance accommodating limited rotation of the blocker member relative to said second structure, a sleeve having internal teeth engaging the external teeth of said second structure and shiftable to clutchingly engage the teeth of said first structure, the ends of said blocker teeth engaging the ends of the teeth of said sleeve and preventing shift of said sleeve into said clutching engagement prior to approximate synchronization of said structures, and means for locking said blocker member on said first structure with said friction surfaces engaged under said blocker-energizing pressure.

2. In a synchronizer of the character described, a rotatable first structure having a set of clutch teeth and a synchronizing friction clutching surface, an axially stationary second structure having external teeth, a sleeve having internal teeth engaging the teeth of the second structure and adapted for shifting movement to clutch the internal teeth thereof with the clutch teeth of the first structure, a blocker synchronizing member having a synchronizing friction clutch surface engageable with the friction surface of the first structure and having blocker teeth adapted to block shifting movement of said sleeve, means for driving the synchronizing member with the second structure for limited rotation relative thereto for positioning the blocker teeth in blocking relationship with respect to the teeth of the sleeve, the teeth of the sleeve when the latter is shifted engaging the blocker teeth to effect synchronizing engagement of the friction surface of the blocker member with the friction surface of the first structure, said blocker teeth accommodating shift of said sleeve after synchronization of said structures has been effected, and means for locking said blocker member on said first structure with the friction clutching surfaces engaged under relatively light pressure prior to shift of said sleeve.

3. In a clutching device of the character described, a first rotatable structure having external clutching teeth and a friction surface, a second rotatable structure having external teeth, a blocker member having a friction surface engageable with the aforesaid friction surface and blocker teeth axially between the teeth of said first and second structures, means for driving said blocker member from said second structure with clearance accommodating limited rotation of the blocker member relative to said second structure, a sleeve having internal teeth engaging the external teeth of said second structure and shiftable to clutchingly engage the teeth of said first structure, the ends of said blocker teeth engaging the ends of the teeth of said sleeve and preventing shift of said sleeve into said clutching engagement prior to approximate synchronization of said structure, and means for locking said blocker member on said first structure with said friction surfaces engaged under relatively light pressure sufficient to drag said blocker member with said first structure and thereby take up said clearance at said driving means prior to shift of said sleeve.

4. In a clutching device of the character described, a first rotatable structure having external clutching teeth and a friction surface, an axially stationary second rotatable structure having external teeth, a blocker member having a friction surface engageable with the aforesaid friction surface and blocker teeth axially between the teeth of said first and second structures, means for driving said blocker member from said second structure with clearance accommodating limited rotation of the blocker member relative to said second structure, a sleeve having internal teeth engaging the external teeth of said second structure and shiftable to clutchingly engage the teeth of said first structure, the ends of said blocker teeth engaging the ends of the teeth of said sleeve and preventing shift of said sleeve into said clutching engagement prior to approximate synchronization of said structures, and a locking ring for holding the blocker member on the first structure with said friction surfaces engaged sufficiently to urge rotation of the blocker member with the first structure prior to shift of said sleeve.

5. In a clutching device of the character described, a first rotatable structure having a clutching part and a friction surface, a blocker having a blocking part and a friction surface, the blocker and the first structure each having a recess formed therein, a locking element in said recesses acting to mount the blocker on the first structure to maintain relatively light engagement of said friction surfaces for urging rotation of the blocker with the first structure, a second rotatable structure, a clutching structure rotating with the second structure and adapted for shift to clutch with said clutching part of the first structure when the speeds of rotation of the first and second structures are approximately the same, and means rotatably connecting the blocker with one of the last two said structures and accommodating limited rotation of the blocker relative to this structure for disposing said blocking part in blocking relationship with respect to the clutching structure prior to shift of the clutching structure and for disposing said blocking part out of said blocking relationship thereby to permit shift of the clutching structure as aforesaid when the first and second structures are rotating at approximately the same speed.

6. In a clutching device of the character described, a first rotatable structure having a clutching part and a friction surface, a blocker having a blocking part and a friction surface, the blocker and first structure each having an annular recess formed therein, each recess having wall portions relatively opposed in the direction of the axis of rotation of the first structure, a locking ring engaging the opposed wall portions of one of said recesses and projecting into the other of said recesses in engagement with one of the opposed wall portions of said other recess to mount the blocker on the first structure to maintain relatively light engagement of said friction surfaces for urging rotation of the blocker with the first structure, a second rotatable structure, a clutching structure rotating with the second structure and adapted for shift to clutch with said clutching part of the first structure when the speeds of rotation of the first and second structures are approximately the same, means rotatably connecting the blocker with one of the last two said structures and accommodating limited rotation of the blocker relative to this structure for disposing said blocking part in blocking relationship with respect to the clutching structure prior to shift of the clutching structure and for disposing said blocking part out of said blocking relationship thereby to permit shift of the clutching structure as aforesaid when the first and second structures are rotating at approximately the same speed, said locking ring being free from engagement with the other of the opposed wall portions of said other recess prior to shift of the clutching structure, and means for fixing the second structure against movement in the direction of its axis of rotation.

7. In a clutching device of the character described, a first rotatable structure having a clutching part and a friction surface, a blocker having a blocking part and a friction surface engageable with the friction surface of the first structure, means extending across, and disposed between the ends of, the friction surfaces aforesaid for connecting the blocker as a unitary assembly with the first structure, a second rotatable structure, means drivingly connecting the blocker with the second structure and accommodating limited relative movement therebetween, and a shift sleeve driven with the second structure and shiftable under control of said blocking part to clutch with said clutching part when the speeds of rotation of said structures are approximately the same.

8. In a clutching device of the character described, a first rotatable structure having a clutching part and a friction surface, a blocker having a blocking part and a friction surface, means for connecting the blocker as a unitary assembly with the first structure, a second rotatable structure, means drivingly connecting the blocker with the second structure and accommodating limited relative movement therebetween, and a shift sleeve driven with the second structure and shiftable under control of said blocking part to clutch with said clutching part when the speeds of rotation of said structures are approximately the same, the blocker and the first structure each having an annular recess adjacent their respective friction surfaces, said blocker connecting means comprising a locking ring in said annular recesses.

9. In a clutching device of the character described, a first rotatable structure having a clutching part and a friction surface, a blocker having a blocking part and a friction surface, means for connecting the blocker as a unitary assembly with the first structure, a second rotatable structure, means drivingly connecting the blocker with the second structure and accommodating limited relative movement therebetween, and a shift sleeve driven with the second structure and shiftable under control of said blocking part to clutch with said clutching part when the speeds of rotation of said structures are approximately the same, the blocker and the first structure each having an annular recess adjacent their respectively friction surfaces, said blocker connecting means comprising a locking ring in said annular recesses, one of said recesses having a wall thereof inclined to radially stress said locking ring in response to axial displacement of the blocker relative to the first structure whereby to facilitate disassembly of the blocker from the first structure.

10. In a clutching device, a first rotatable structure having a positive clutching part and a friction surface, a blocker having a blocking part and a friction surface engaging the friction surface of the first structure, one of said friction surfaces comprising threads engaging the other of said friction surfaces, means extending between the blocker and the first structure for holding the blocker in assembled relationship with respect to the first structure such that said threaded surface is constantly frictionally engaged with the said other friction surface, a second rotatable structure, means drivingly connecting the blocker with the second structure and accommodating limited relative movement therebetween, and a shift sleeve driven with the second structure and shiftable under control of said blocking part to clutch with said clutching part when the speeds of rotation of said structures are approximately the same.

11. In a power transmitting mechanism including driving and driven structures adapted to be positively clutched; one of said structures having a set of clutch teeth and a friction surface, a clutching sleeve drivingly carried by the other of said structures and shiftable axially to clutch with said teeth, a blocker member adapted to engage said friction surface under relatively light blocker-energizing pressure and having blocker means, said blocker member having a rotatable connection with said other structure accommodating limited rotation of the blocker member relative to said other structure for accommodating positioning of said blocker means in blocking relationship with respect to said clutching sleeve when said structures are rotating at relatively different speeds and for disposing said blocker means out of said blocking relationship thereby to accommodate shift of said clutching sleeve as aforesaid when said structures are rotating at approximately the same speed, and means locking said blocker member on said friction surface in engagement therewith under said relatively light blocker-energizing pressure whereby to induce said positioning of said blocker member in said blocking relationship prior to clutching shift of said clutching sleeve.

OTTO E. FISHBURN.